United States Patent
Ishida et al.

(10) Patent No.: US 6,655,513 B2
(45) Date of Patent: *Dec. 2, 2003

(54) HYDRAULIC BRAKE DEVICE FOR A VEHICLE

(75) Inventors: Satoshi Ishida, Chiryu (JP); Michiharu Nishii, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 42 days.

This patent is subject to a terminal disclaimer.

(21) Appl. No.: 09/865,622

(22) Filed: May 29, 2001

(65) Prior Publication Data

US 2001/0047914 A1 Dec. 6, 2001

(30) Foreign Application Priority Data

May 30, 2000 (JP) ........................................ 2000-161248

(51) Int. Cl.[7] ............................ B60T 11/00; B60T 13/20
(52) U.S. Cl. ........................... 188/357; 188/360; 60/550
(58) Field of Search ............................ 188/151 R, 355, 188/356, 357, 360; 60/550, 552, 553, 582

(56) References Cited

U.S. PATENT DOCUMENTS

| | | |
|---|---|---|
| 3,910,048 A | 10/1975 | Gardner |
| 3,914,941 A * | 10/1975 | Gardner ........................ 60/553 |
| 3,990,241 A * | 11/1976 | Owens .......................... 60/553 |
| 5,970,710 A | 10/1999 | Dieringer |
| 2001/0049940 A1 * | 12/2001 | Nishii et al. .................. 60/553 |

FOREIGN PATENT DOCUMENTS

| | | |
|---|---|---|
| DE | 34 08 873 C2 | 1/1992 |
| DE | 199 49 158 A1 | 4/2001 |
| DE | 100 55 715 A1 | 5/2001 |
| GB | 2 155 571 A | 9/1985 |
| JP | 2001-138899 A * | 5/2001 |

* cited by examiner

*Primary Examiner*—Pam Rodriguez
*Assistant Examiner*—Thomas J. Williams
(74) *Attorney, Agent, or Firm*—Burns, Doane, Swecker & Mathis, LLP

(57) ABSTRACT

A hydraulic brake device for a vehicle includes an auxiliary piston having an effective cross-sectional area larger than that of a master piston, and a pressure transmitting chamber provided between the large diameter portion and the master piston. The auxiliary piston is operatively associated with the assisting operation of an assisting device. A valve mechanism hydraulically closes the pressure transmitting chamber when the actuation of the master piston is assisted by the assisting device through the auxiliary piston and establishes hydraulic communication between the pressure transmitting chamber and a reservoir of the master cylinder when the master piston is not actuated by the assisting device.

18 Claims, 11 Drawing Sheets

HYDRAULIC BRAKE DEVICE FOR A VEHICLE

This application is based on and claims priority under 35 U.S.C. §119 with respect to Japanese Patent Application 2000-161248, filed on May 30, 2000, the entire content of which is incorporated herein by reference.

FIELD OF THE INVENTION

This invention generally relates to a hydraulic brake device for a vehicle. More particularly, the present invention pertains to a hydraulic brake device for a vehicle provided with an assisting device to assist master cylinder actuation in response to a brake pedal depression.

BACKGROUND OF THE INVENTION

A known negative pressure booster (vacuum servo motor) for use in a power braking system is disclosed in U.S. Pat. No. 3,910,048 published on Oct. 7, 1975. The disclosed vacuum servo motor includes a pressure ratio changer in which a first piston and a second piston supply a master cylinder with an operative force. The first piston is connected with a wall within the servo motor which is moved by a pressure differential across the wall. The second piston is concentrically positioned within the first piston to transmit an input force which operates a control valve that produces the pressure differential, and also operates a hydraulic lock valve located within the master cylinder. As the first piston and the second piston move together in response to movement of the wall, hydraulic fluid will flow into a locking chamber past the lock valve. When the maximum force output capable of being generated by the pressure differential is reached, simultaneous movement of the first and the second pistons ceases. Further manual force input from the operator will move the second piston within the first piston to close the lock valve and hold the hydraulic fluid within the locking chamber to prevent the first piston from moving.

In more detail, as the first and the second pistons move forward, hydraulic pressure develops in pressure chambers of the master cylinder. The output from the first and the second pistons follows a line 188 illustrated in FIG. 3 of the aforementioned U.S. Pat. No. 3,910,048 until the entire second chamber in the servo motor contains air at atmospheric pressure. At a point 190 in FIG. 3 of the patent, the input force from the pedal is transmitted through a plunger and a sleeve into the second piston which is shown in FIG. 1 of the patent. This input force causes the second piston to independently move and permits a valve spring to close a hydraulic passage. As the second piston moves further, the output follows the line 192 shown in FIG. 3 of the patent. In the event negative pressure is unavailable at the intake manifold, an input force applied to brake pedal will initially move the second piston within the first piston to permit immediate closure of the hydraulic passage by the lock valve. The output from the second piston then follows the line 196 shown in FIG. 3 of the patent. The line 196 exhibits a higher output than the line 195 in which both pistons move during a no power condition.

The servo motor uses in a power braking system as disclosed in the aforementioned patent is configured to produce an output following the line 192 in FIG. 3 of the patent by enclosing the increased hydraulic pressure in the locking chamber in response to the movement of the second piston within the first piston after reaching the point 190. Even when the servo motor fails (e.g., negative pressure is unavailable), the output follows the line 196. In order to produce an output following the line, as shown in FIG. 1 of the patent the servo motor as an assisting device needs to be configured to assure a sufficient amount of movement of the second piston relative to the first piston. Accordingly, the structure of the known servo motor requires substantial change. Because the entire hydraulic pressure brake device needs to be redesigned, an increase in the cost associated with producing the device is unavoidable.

A need thus exists for an improved hydraulic brake device for a vehicle having an assisting device that drives a master cylinder in response to a brake pedal operation.

It would thus be desirable to provide a hydraulic brake device for a vehicle that is able to assure proper input-output performance when the assisting device (e.g., brake booster) fails, while minimizing structural changes in the assisting device.

SUMMARY OF THE INVENTION

According to an aspect of the present invention, a hydraulic brake device for a vehicle includes a master cylinder having a master piston for supplying brake pressure to a wheel cylinder in response to brake pedal depression, an assisting device for assisting actuation of the master piston in response to the brake pedal depression, an auxiliary piston including an effective cross-sectional area larger than that of the master piston and being operatively associated with the assisting operation of the assisting device, a pressure transmitting chamber provided between the auxiliary piston and the master piston, and a valve mechanism for hydraulically closing the pressure transmitting chamber when the actuation of the master piston is assisted by the assisting device through the auxiliary piston and establishing hydraulic communication between the pressure transmitting chamber and the reservoir of the master cylinder when the master piston is not actuated by the assisting device.

When the master piston is assisted through the auxiliary piston by the assisting device, the pressure transmitting chamber is hydraulically sealed by the valve device. Then the auxiliary piston and the master piston are hydraulically connected. When the assisting is not carried out by the assisting device, the pressure in the second pressure transmitting chamber becomes atmospheric pressure by the valve device. Accordingly, the auxiliary piston and the master piston can be mechanically connected. A negative pressure booster serving as a negative pressure assisting device or a hydraulic pressure booster serving as a hydraulic pressure assisting device can be used as the assisting device.

The auxiliary piston is coaxial with the master piston and is formed rearward of the master piston. The auxiliary piston includes a large diameter portion having the effective cross-sectional area larger than that of the master piston. The pressure transmitting chamber is provided between the large diameter portion and the master piston, and the valve mechanism is provided in the auxiliary piston.

The auxiliary piston includes a cylindrical body in which is accommodated the master piston in a fluid-tight and slidable manner, and further includes the pressure transmitting chamber between the inner surface of the cylindrical body and the outer surface of the master piston, with the valve mechanism being provided in the master piston.

The elastic members are provided between the auxiliary piston and the assisting device or the master piston and the assisting device and the brake input transmitting member is desirably arranged to connect with the brake pedal without being in contact with the elastic members.

The hydraulic brake device further includes a hydraulic passage formed in the master piston or in the auxiliary piston for connecting the pressure transmitting chamber with a brake fluid reservoir supplying the brake fluid to the master cylinder. The valve mechanism including a valve seat disposed in the hydraulic passage, a valve body to be seated on or separated from the valve seat for closing or opening the hydraulic passage, a first biasing device always biasing the valve body toward the valve seat, a brake input transmitting member for driving the valve body in response to the brake pedal depression when the assisting device is not operated, a shock absorbing member engaged with the brake input transmitting member and arranged to be in contact with the valve body, and a second biasing device always biasing the shock absorbing member toward the valve body opposite to the brake input transmitting member with a biasing force larger than that of the first biasing means.

According to another aspect of the invention, a hydraulic brake device for a vehicle includes a master cylinder for supplying brake pressure in response to brake pedal depression, wherein the master cylinder includes a master piston, an assisting device for assisting actuation of the master piston in response to brake pedal depression, and an auxiliary piston operatively associated with the assisting device to be operated upon operation of the assisting device. The auxiliary piston includes an effective cross-sectional area larger than that of the master piston. A pressure transmitting chamber is provided between the auxiliary piston and the master piston, and a hydraulic passage is formed in the master piston or in the auxiliary piston. A valve seat is disposed in the hydraulic passage, and a valve body is biased by a spring to engage the valve seat to close the hydraulic passage and seal the pressure transmitting chamber when the actuation of the master piston is assisted by the assisting device through the auxiliary piston. The valve body is movable away from the valve seat to open the hydraulic passage and establish hydraulic communication between the pressure transmitting chamber and a reservoir of the master cylinder during non-operation of the master piston by the assisting device.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
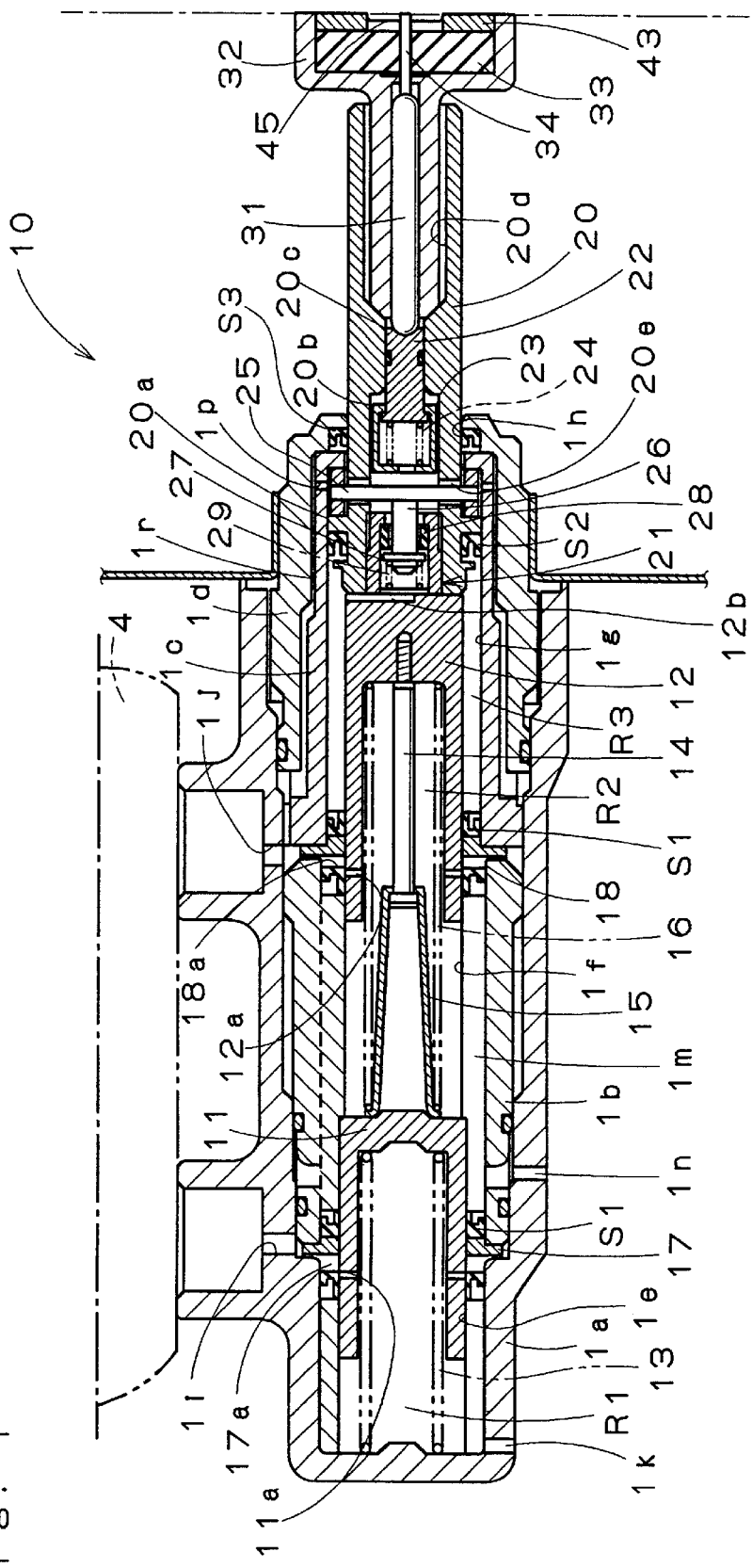
FIG. 1 is a cross-sectional view of a master cylinder portion of a hydraulic brake device according to one embodiment of the present invention.
Figure 2:
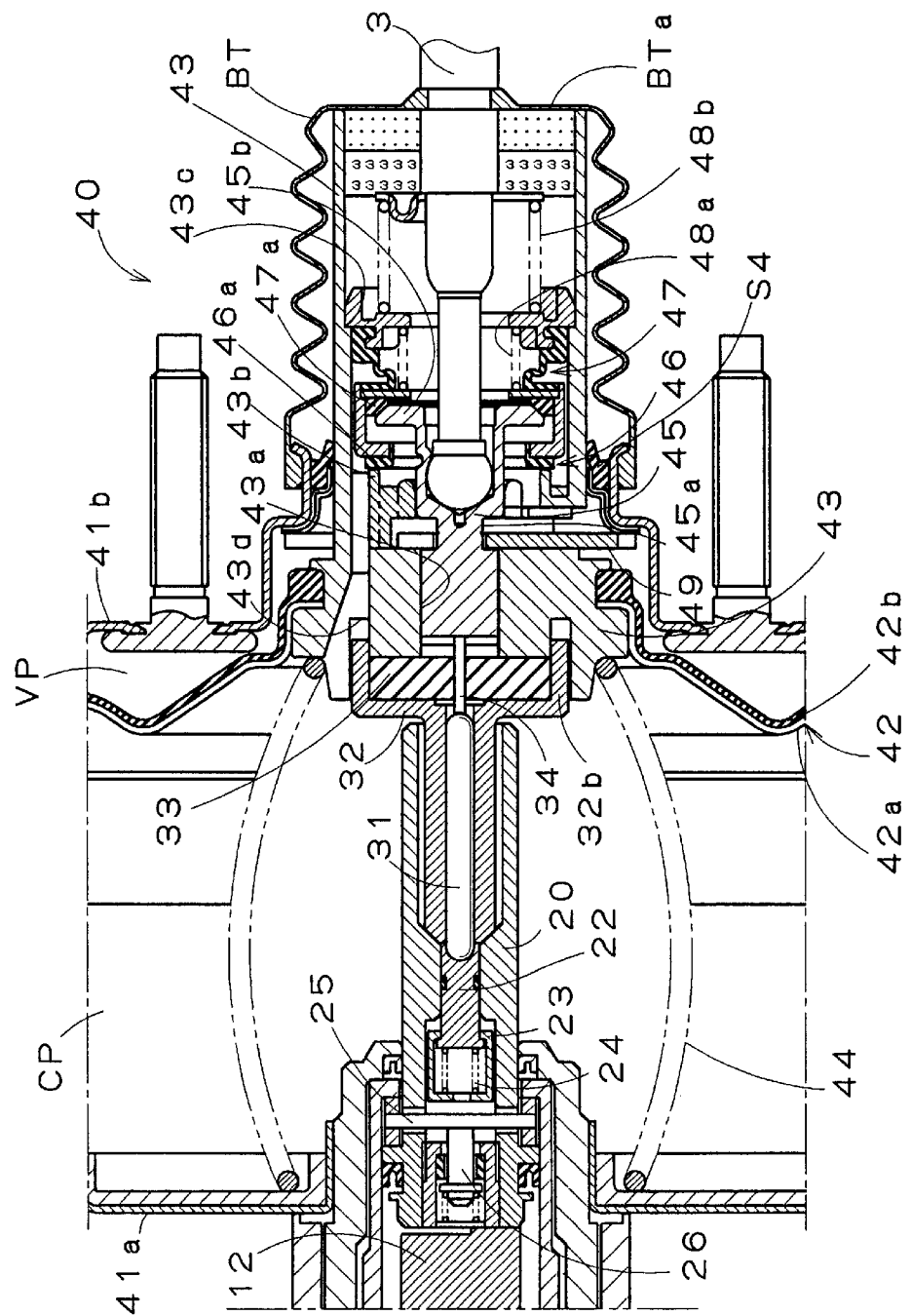
FIG. 2 is a cross-sectional view of a negative pressure booster portion of the hydraulic brake device according to the present invention.

Referring initially to FIGS. 1 and 2, the hydraulic brake device of the present invention includes a master cylinder shown in FIG. 1 and a negative pressure booster shown in FIG. 2. The hydraulic brake device is operatively associated with a brake pedal and the depressing force or operation force applied to the brake pedal is transmitted to an input rod 3 as a braking force. In response to the braking force, brake pressure is supplied from a brake master cylinder 10 under the assistance of a negative pressure booster 40. The brake pressure is supplied to each of the wheel cylinders (not shown) provided on respective wheels of the vehicle.

As shown in FIG. 1, the master cylinder 10 includes a cylinder body having a first cylinder 1a, a second cylinder 1b accommodated in the first cylinder, a third cylinder 1c, and a fourth cylinder 1d. A first piston 11, a second piston 12 serving as a master piston and a third piston 20 serving as an auxiliary piston in the disclosed embodiment of the present invention are accommodated in series in the cylinder body. The first cylinder 1a has a bottom portion at one end (i.e., the left end in FIG. 1) and is provided with a stepped bore. The inner diameter of the stepped bore gradually increases toward the open end of the bore (i.e., the right end in FIG. 1). The second cylinder 1b possesses an approximately cylindrical shape and includes a stepped bore defined by cylinder bore portions 1e, 1f having different diameters. A plurality of axially extending grooves 1m are formed in the inner peripheral surface of the second cylinder 1b.

Both the third cylinder 1c and the fourth cylinder 1d are generally cylindrical in shape, with the fourth cylinder 1d enclosing or surrounding the outer periphery of the third cylinder 1c so that an annular hydraulic passage (hydraulic chamber) 1r is formed between the third and fourth cylinders 1c, 1d. A cylinder bore 1g having an inner diameter larger than the inner diameter of the cylinder bore portions 1e, 1f is formed in the third cylinder 1c. A port 1p connected with the hydraulic passage 1r is formed in the peripheral portion of the third cylinder 1c. A bore 1h having the same inner diameter as that of the cylinder bore 1f, but smaller than the inner diameter of the cylinder bore 1g, is formed at the bottom portion (i.e., right end) of the fourth cylinder 1d. The first cylinder 1a is provided with fluid supply ports 1i, 1j and output ports 1k, 1n. The output port 1k is connected with the cylinder bore 1e through the groove 1m and the output port 1n is connected with the cylinder bore 1f through the groove 1m.

An annular member 17 is arranged at the front end (i.e., left end) of the second cylinder 1b located in the first cylinder 1a. The annular member 17 has an axially extending communicating hole 17a, and cup-shaped sealing members S1 are positioned on both sides of the annular member 17. The cylinder bore 1e can communicate with the fluid supply port 1i through the communicating hole 17a.

An annular member 18 provided with an axially extending communicating hole 18a is arranged between the second cylinder 1b and the third cylinder 1c. Sealing member S1 positioned between the second cylinder 1b and the third cylinder 1c are arranged on opposite sides of the annular member 18. The cylinder bore 1f can communicate with the fluid supply port 1j through the communicating hole 18a.

The first piston 11 having a bottom portion (closed end) is accommodated in the cylinder bore 1e and is slidably supported in a fluid-tight manner by the annular member 17. A pressure chamber R1 is defined between the first cylinder 1a and the first piston 11. The second piston 12 is accommodated in the cylinder bore 1f and is slidably supported in a fluid-tight manner by the annular member 18. A pressure chamber R2 is defined between the first piston 11 and the second piston 12. Rearward movement of the first piston 11 is restricted by a step between the cylinder bore portions 1e, 1f. At the rear end position under the non-operated condition, a communicating hole 11a is formed on a skirt portion of the annular member 17 that faces the communicating hole 17a. The pressure chamber R1 is connected with a reservoir 4 through the fluid supply port 1i.

A spring 13 is disposed between the front end surface of the first cylinder 1a and the recessed bottom surface of the first piston 11 so that the first piston 11 is always biased in the rearward direction (i.e., toward the right side in FIG. 1). One end of a rod 14 is fixed to the recessed bottom surface at the front portion of the second piston 12. The other end of the rod 14 forming a head portion of the rod is supported by the end portion of a retainer 15. A spring 16 is disposed between the first piston 11 and the second piston 12 to always biasing the pistons away from one another. Accordingly, when the head portion of the rod 14 is engaged with the end portion of the retainer 15, rearward movement of the second piston 12 is restricted or prevented. The third piston 20 may be used as a stopper to restrict or prevent the rearward movement of the second piston 12 without providing the rod 14 and the retainer 15.

Under the non-operated condition, a communicating hole 12a formed in a skirt portion of the second piston 12 faces the communicating hole 18a of the annular member 18, and the pressure chamber R2 is connected with the reservoir 4 through the fluid supply port 1j. Further, a groove 12b is provided in the rear end surface of the second piston 12. As explained in more detail later, even when the second piston 12 is in contact with the front end surface of the third piston 20, connection between the hydraulic passage and a hollow portion 20b can be assured.

As shown in FIG. 1, the third piston 20, which forms an auxiliary piston, includes a large diameter land portion 20a having an effective cross-sectional area larger than that of the second piston 12 which is slidably movable in the annular member 18. A cup-shaped sealing member S2 is provided in front of the large diameter land portion 20a and is accommodated in a fluid-tight and slidable manner in the cylinder bore 1g. Accordingly, a pressure transmitting chamber R3 is defined between the inner surface of the cylinder bore 1g and the outer surface of the second piston 12 and between the sealing members S1, S2.

The third piston 20 is supported in a fluid-tight and slidable manner by a cup-shaped sealing member S3 in the bore 1h of the fourth cylinder 1d at a location rearward of the land portion 20a. The third piston 20 is provided with an axially extending stepped hollow portion. The stepped hollow portion includes two spaced apart large diameter hollow portions 20b, 20d, and a small diameter hollow portion 20c located between the large diameter hollow portions 20b, 20d. Axially elongated holes 20e connected to or communicating with the hollow portion 20b are formed in the top and bottom regions of the third piston 20 as shown in FIG. 1.

In the illustrated and described embodiment, a valve device having the following construction is provided in the third piston 20. A plunger 22 is supported in a fluid-tight and slidable manner in the hollow portion 20c. A cylindrical shock absorbing member 23 forming a damping member is provided at the front end of the plunger 22. The rear end of the cylindrical shock absorbing member 23 is supported at the front end of the plunger 22 as shown in FIG. 1. A spring 24 is disposed in the shock absorbing member 23 and always biases the shock absorbing member 23 in the direction separating the shock absorbing member 23 from the plunger 22. Accordingly, even when forward movement of the shock absorbing member 23 is interrupted, if the plunger 22 is pushed by a force larger than the biasing force of the spring 24, only the plunger 22 can move forward. A pin 25 passing through the elongated holes 20e which extend towards the top and bottom is movably supported in the axial direction of the elongated holes 20e. The pin 25 is arranged in front of the shock absorbing member 23. When the shock absorbing member 23 contacts the pin 25, the pressure operating an open-close valve 26 in the rearward direction (a pressure directed toward a valve seat 28) by the brake pressure in the pressure transmitting chamber R3 is set to be larger than the biasing force of the spring 24.

A valve device 21 is arranged in front of the pin 25 in the hollow portion 20b. The valve device 21 includes the open-close valve 26, a cylindrical case 27 having a bottom portion and accommodating the open-close valve 26, and a spring 29. The front of the open-close valve 26 includes a flange portion that is movably supported in the axial direction within the case 27. The rear end of the open-close valve 26 includes a shaft portion extending rearward from the case 27 to be contacted with the pin 25. The valve seat 28 is provided at the rear end of the case 27, and the flange portion of the open-close valve 26 is adapted to be seated on the valve seat 28. Further, the spring 29 is disposed in the case 27 in front of the open-close valve 26. The flange portion of the open-close valve 26 is thus always biased toward the valve seat 28 by the spring 29. Accordingly, when the pin 25 is positioned at the rear end of the elongated holes 20e, the flange portion of the open-close valve 26 is kept seated on the valve seat 28. The biasing force of the spring 29 is set to be smaller than that of the above mentioned spring 24. Accordingly, when the open-close valve 26 is pushed by the shock absorbing member 23 through the pin 25 under the free condition, the spring 24 is not compressed. Rather, only the spring 29 is compressed and the flange portion of the open-close valve 26 is separated from the valve seat 28.

With the valve device constructed in the manner described above, when the brake is not operated as shown in FIG. 1, the pressure transmitting chamber R3 is connected with the hydraulic passage 1r through the valve seat 28, the elongated holes 20e and the port 1p. Under a brake-operated condition in which the third piston 20 moves forward through operation of a negative pressure booster 40, the details of which will be described below, the pin 25 becomes movable in the elongated holes 20e. Accordingly, when the rear end of the open-close valve 26 moves backward or rearward, while in contact with the pin 25, by the force of the spring 29, the flange portion becomes seated on the valve seat 28, thus interrupting communication between the pressure transmitting chamber R3 and the hydraulic passage 1r.

Figure 3:
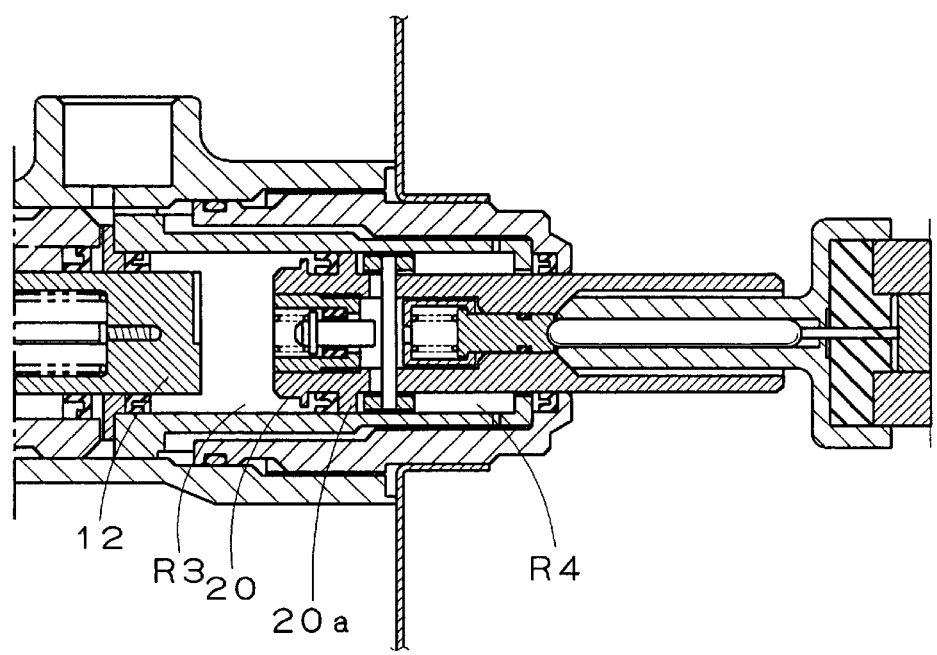
FIG. 3 is a cross-sectional view of a part of the master cylinder portion shown in FIG. 1 illustrating the relationship between the second and third piston portions under a condition in which an assisting by the negative pressure booster is operated.

Accordingly, when the flange portion of the open-close-valve 26 is seated on the valve seat 28, the pressure transmitting chamber R3 becomes a hydraulically sealed space filled with brake fluid, and the second piston 12 and the third piston 20 are hydraulically connected as a unit. At this time, the effective cross-sectional area of the land portion 20a of the third piston 20 is larger than that of the second piston 12. A clearance is formed between the rear end surface of the second piston 12 and the front end surface of the third piston 20 in accordance with the forward movement of the third piston 20 and the pressure transmitting chamber R3 is increased as shown in FIG. 3. In this condition, the second piston 12 and the third piston 20 move forward.

Figure 4:
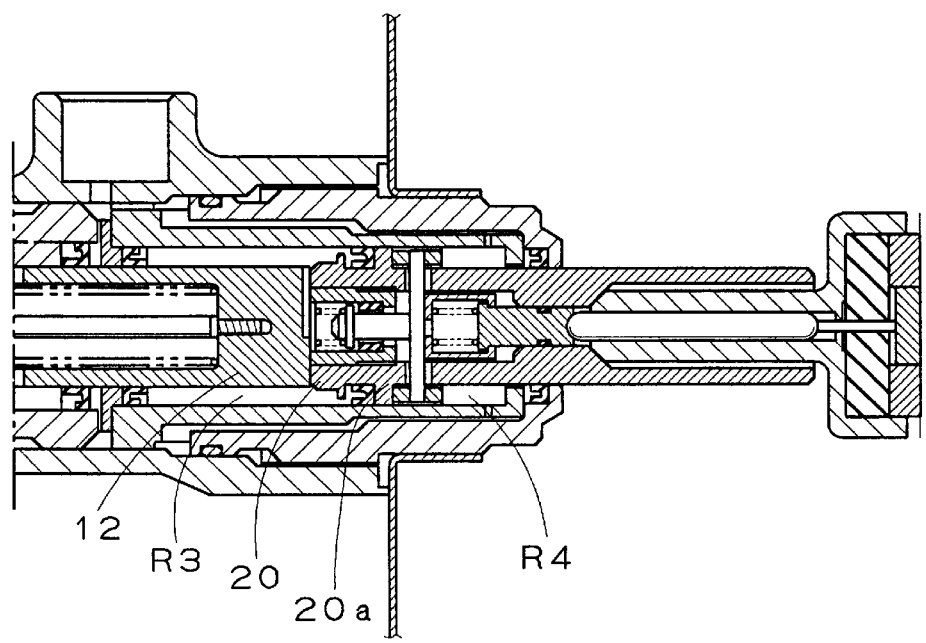
FIG. 4 is a cross-sectional view of a part of the master cylinder portion shown in FIG. 1 illustrating the relationship between the second and third piston portions when the negative pressure booster fails.

If the brake pedal is depressed when the third piston 20 is stopped, the plunger 22 is moved forward relative to the third piston 20, and the shock absorbing member 23 contacts the pin 25. When the plunger 22 is further moved forward, the open-close valve 26 is moved forward through the shock absorbing member 23 and the pin 25. The flange portion of the open-close valve 26 is thus separated from the valve seat 28, and the pressure transmitting chamber R3 is connected with the hydraulic passage 1r as shown in FIG. 4.

The first transmitting member 31 transmitting the depression force of the brake pedal and a second transmitting member 32 transmitting the driving force by the negative pressure booster 40 are accommodated in the hollow portion 20d at the rear of the third piston 20. The transmitting member 31 and the plunger 22 form a brake input transmitting member. The first transmitting member 31 is configured as a rod having a front end that is in contact with the rear end of the plunger 22 and a rear end connected to a plunger 45 through a transmitting pin 34 (extending through a reaction force rubber disc 33 as described in more detail below). The second transmitting member 32 is connected with a driving member 43 through the reaction force rubber disc 33.

As shown in FIG. 2, the negative pressure booster 40 is provided with a pair of housings or shells 41a, 41b interconnected with each other to define an interior that is divided by a movable wall 42. A constant pressure chamber or negative pressure chamber CP is defined forward of the wall 42 while a variable pressure chamber VP is defined rearward of the wall in the negative pressure booster 40. The constant pressure chamber CP is connected with a negative pressure source such as an intake manifold through an inlet so that a negative pressure is maintained in the constant pressure chamber CP.

The movable wall 42 is provided with a pressure receiving plate 42a and a diaphragm 42b. The middle or central portion of the movable wall 42 is hermetically fixed to the driving member 43 adjacent one open end portion of the cylindrical driving member 43 which forms a power piston. The other open end portion of the cylindrical driving member 43 extends rearward through the housing 41b. The driving member 43 is slidably supported by an opening in the housing 41b through a sealing member S4 and is enclosed by a boot BT. The boot BT is fixed to the input rod 3 and a communicating hole BTa is formed on the opening end portion of the driving member 43. A spring 44 is disposed between the front end portion of the driving member 43 and the inner surface of the front housing 41a so that the movable wall 42 is biased toward the rear housing 41b by the spring 44.

The input rod 3 extends axially along the axial central portion in the driving member 43. The end portion of the input rod 3 is connected with the plunger 45 through a ball joint. The plunger 45 is slidably supported by an axially extending communicating hole 43a formed in the driving member 43. A valve seat 43b is formed on the outer periphery of the driving member 43 in which is formed the communicating hole 43a. A first control valve mechanism 46 enclosing the valve seat 43b and biasing an annular valve portion 46a to be seated on the valve seat 43b is configured in the driving member 43. The first control valve mechanism 46 which forms a control valve is provided with a valve seat 45b at the rear end of the plunger 45. A second control valve mechanism 47 biasing an annular valve portion 47a to be seated on the valve seat 45b is connected with the first control valve mechanism 46. The second control valve mechanism 47 which forms an air valve is provided with the valve portion 47a in front of the cylindrical elastic member. The second control valve mechanism 47 is always biased toward the valve seat 43b by a spring 48a that is supported at its rear end. The rear end of the elastic member configuring the second control valve mechanism 47 is always biased toward the valve seat 43b by a spring 48b and is supported by a stepped portion 43c formed inside the driving member 43.

An annular small diameter portion 45a is formed at the rear end portion of the plunger 45. A key member 49 is engaged with the small diameter portion 45a and is movable over a predetermined distance in the axial direction. The key member 49 extends outwardly beyond the outer periphery of the driving member 43 and is engaged with the housing 41b to restrict backward movement of the plunger 45 in axial direction. Accordingly, the return position of the movable wall 42 is defined.

A recess portion 43d is formed at the front end of the driving member 43. The rear end portion 32b of the second transmitting member 32 is received in the recess portion 43d, with a reaction force rubber disc 33 being accommodated between the second transmitting member 32 and the driving member 43. The transmitting pin 34 is in contact with the rear end of the first transmitting member 31. The rear end of the transmitting pin 34 is in contact with the end surface of the plunger 45. The transmitting pin 34 extends through the reaction force rubber disc 33 and is movably supported in the axial direction.

Accordingly, with the negative pressure booster 40 being under the operated condition, when the pushing force of the movable wall 42 is increased to a predetermined value by the pressure increase in the variable pressure chamber VP, the portion of the reaction force rubber disc 33 facing the plunger 45 expands rearwardly and comes into contact with the end surface of the plunger 45. The reaction force to the rear in response to a force of the movable wall 42 is added toward the plunger 45. The first control valve mechanism 46 and the second control valve mechanism 47 are controlled in response to a force difference between the reaction force and the operating force added to the input rod 3.

Referring now to FIGS. 1–8, the operation of the overall hydraulic pressure brake device is as follows. FIG. 3 shows the relationship between the second and the third pistons 12, 20 when the assisting mechanism is operated. FIG. 4 shows the relationship between the second and the third pistons 12, 20 when the assisting operation fails. FIGS. 5–8 show the operating condition of the components such as the valve device of the hydraulic pressure brake device in detail. In FIGS. 5–8, the case 27 shown in FIG. 1 is omitted, and the open-close valve 26, the valve seat 28, and the spring 29 are illustrated as being directly provided in the hollow portion 20b, but the operation is the same as in FIG. 1.

Figure 5:
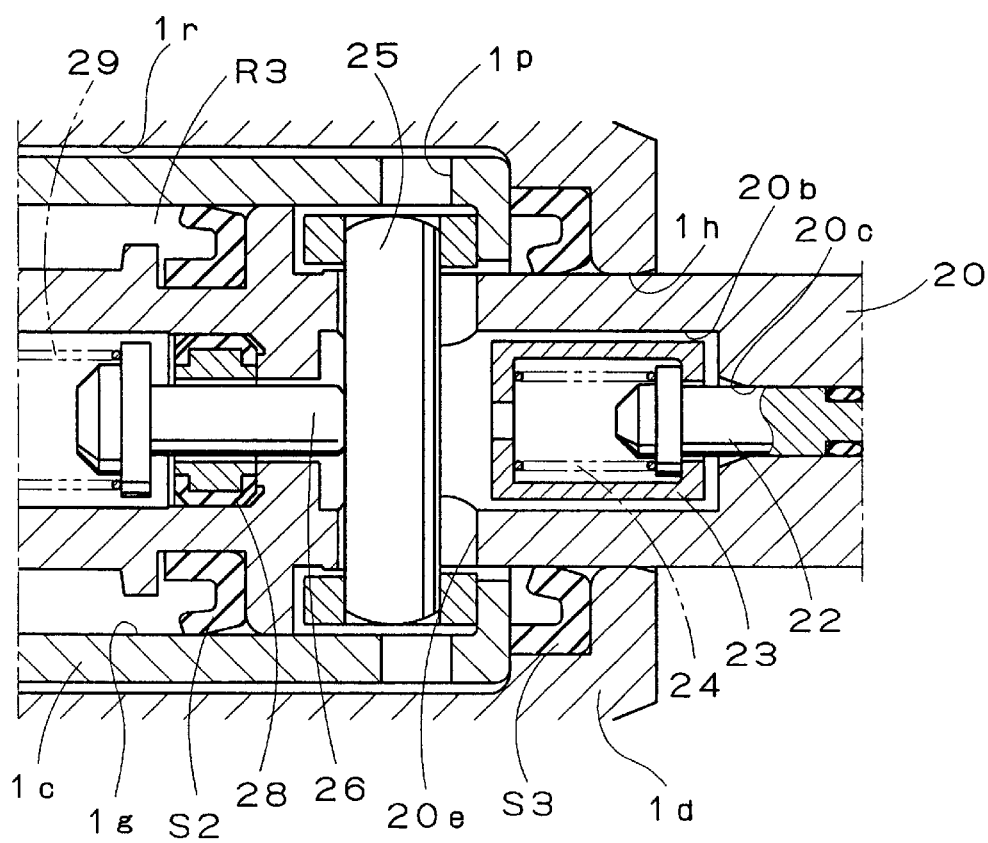
FIG. 5 is a cross-sectional view of a valve device portion of the master cylinder portion when the brake pedal is not operated.

Initially, when the brake pedal is not operated, each component is positioned as shown in FIGS. 1 and 2. The valve device and other features are positioned as shown in FIG. 5. Accordingly, with the negative pressure booster 40 not being operated, the second control valve mechanism 47 is closed because the valve portion 47a is seated on the valve seat 45b. The introduction of atmospheric air into the variable pressure chamber VP is thus prevented or interrupted. At this time, only the negative pressure in the constant pressure chamber CP is operated to the first control valve mechanism 46.

When the input rod 3 is pushed forward by the operation of the brake pedal, the valve portion 47a of the second control valve mechanism 47 of the negative pressure booster 40 is eventually separated from the valve seat 45b. When the total of the operating force applied to the input rod 3 and the pushing force to the input rod 3 caused by the pressure difference between the variable pressure chamber VP and the constant pressure chamber CP becomes greater than the force of the spring 48b, the input rod 3 and the plunger 45 move forward. The valve portion 46a of the first control valve mechanism 46 contacts the valve seat 43b of the driving member 43 and communication between the variable pressure chamber VP and the constant pressure chamber CP is interrupted. Then the valve portion 47a of the second control valve mechanism 47 is separated from the valve seat 45b and the pressure in the variable pressure chamber VP is increased because atmospheric pressure is introduced into the variable pressure chamber VP through the communicating hole BTa of the boot BT. Accordingly, the force biasing or moving the movable wall 42 forward is generated. The third piston 20 and the second piston 12 are moved forward through the driving member 43, the reaction force rubber disc 33, and the second transmitting member 32. Further, the first piston 11 is moved forward.

Figure 6:
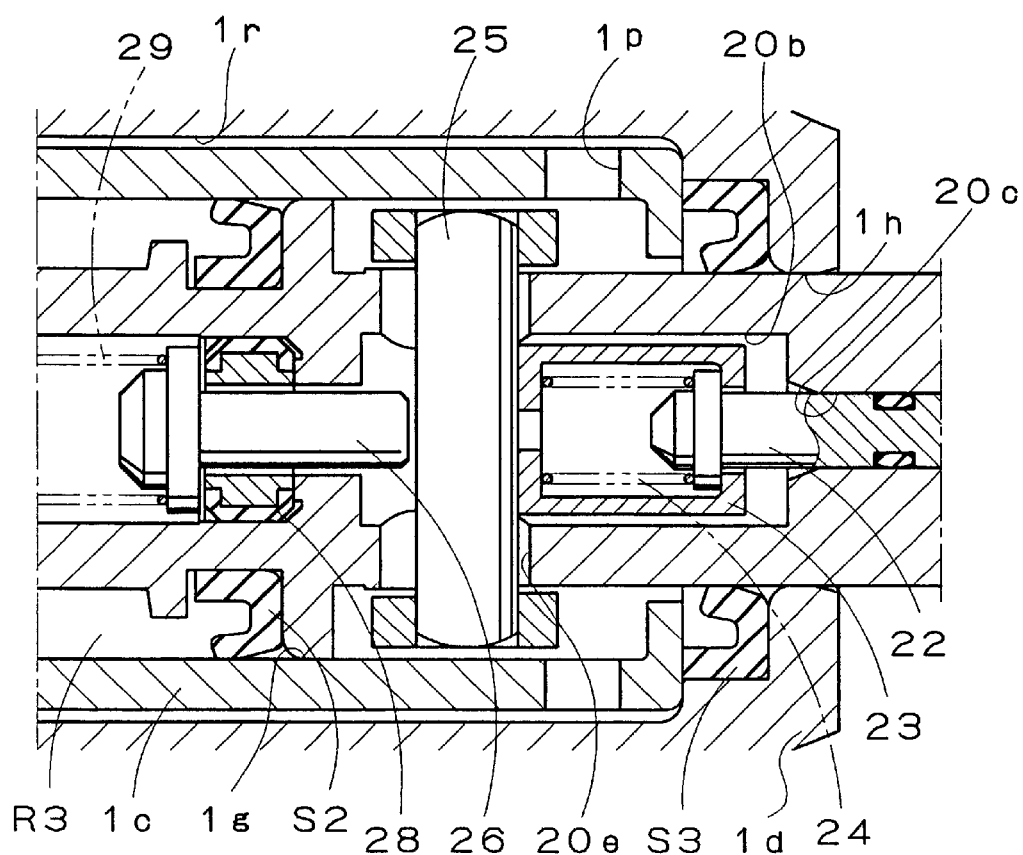
FIG. 6 is a cross-sectional view of the valve device portion under a condition in which the assisting by the negative pressure booster is operated.

In this case, corresponding to the forward movement of the third piston 20, the open-close valve 26 is seated on the valve seat 28 as shown in FIGS. 3 and 6, and the pressure transmitting chamber R3 becomes a hydraulically sealed space. When the third piston 20 is moved forward by the assisting operation of the negative pressure booster 40 under this condition, the pressure moving the open-close valve 26 rearward (the pressure toward the valve seat 28) by the brake pressure in the pressure transmitting chamber R3 is increased. Accordingly, the open-close valve 26 remains seated on the valve seat 28. A clearance is formed between the rear end surface of the second piston 12 and the front end surface of the third piston 20. A hydraulic chamber R4 is formed at the rear of the large diameter portion 20a of the third piston 20. Accordingly, the third piston 20 is hydraulically combined with the second piston 12 through the brake fluid filled in the first pressure transmitting chamber R3. The third piston 20 and the second piston 12 move forward, and the hydraulic pressure in response to the cross-sectional area of the large diameter land portion 20a of the third piston 20 is outputted to the wheel cylinders. In this manner, the assisting is carried out by the negative pressure booster 40 and the input-output performance at this stage is shown in FIG. 9.

Figure 9:
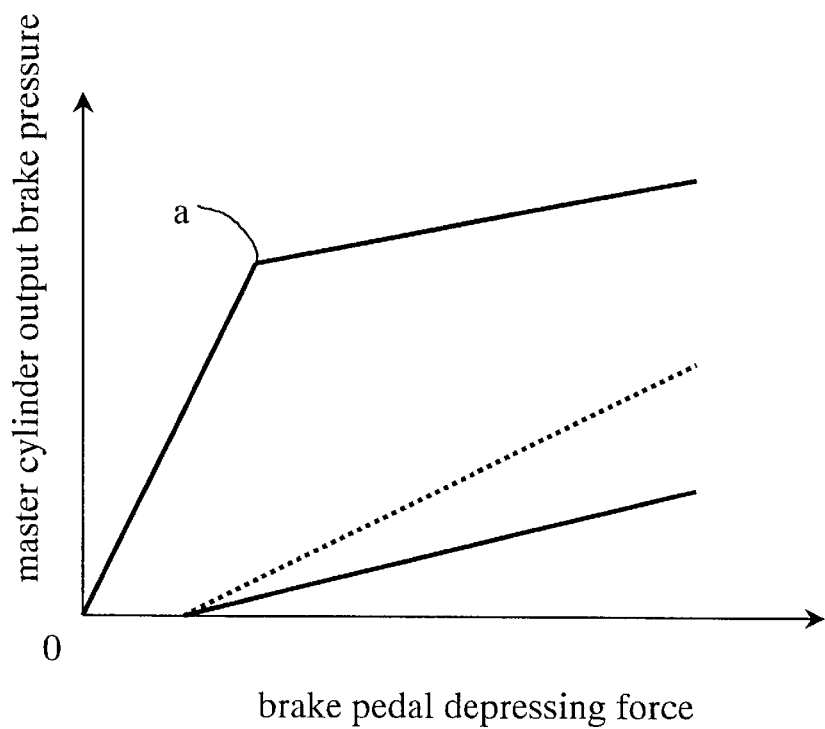
FIG. 9 is a graph showing the input-output performance characteristics associated with the embodiment of the present invention shown in FIGS. 1–8.

FIG. 9 shows the relationship between the depressing force of the brake pedal and the outputting force (output brake pressure of the master cylinder 10). The upper solid line shows the performance when the negative pressure booster 40 is operated. The lower solid line shows the performance of a known device upon failure. The dashed line shows the performance of the device of the present invention under failure. In FIG. 9, when the brake pedal force is increased to the point "a", the assisting operation by the negative pressure booster 40 reaches its limit.

Figure 7:
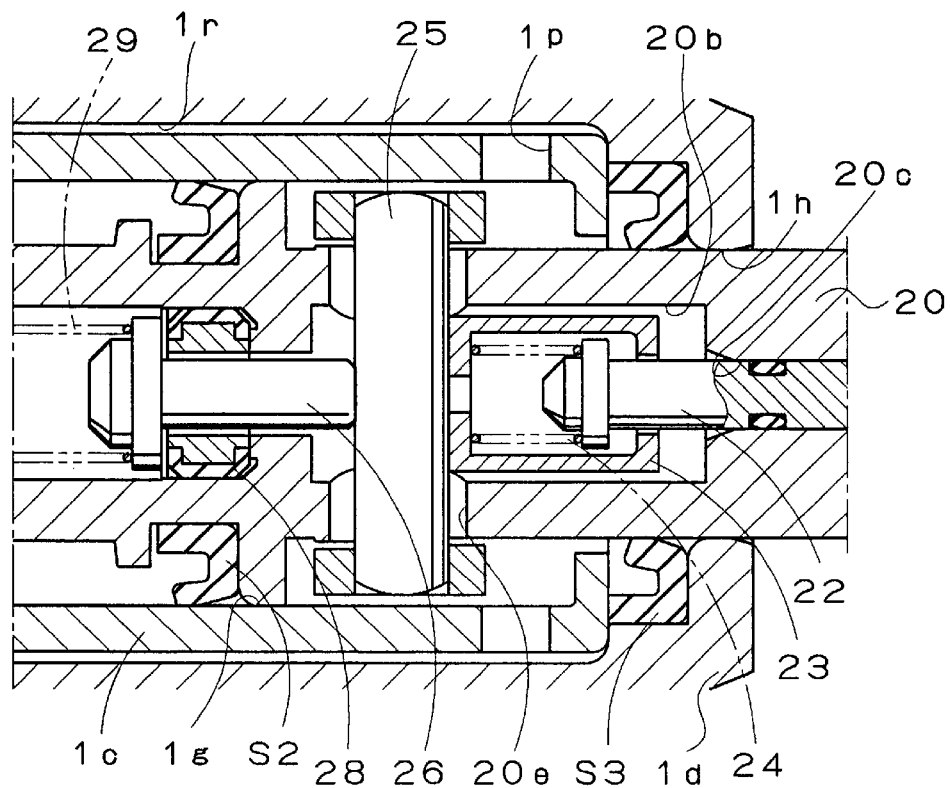
FIG. 7 is a cross-sectional view of the valve device portion under a condition in which the assisting by the negative pressure booster reaches the assisting limit.

Further, when the brake pedal is depressed beyond the assisting limit of the negative pressure booster 40 (point "a" in FIG. 9), the input rod 3 is moved forward in response to the operation of the brake pedal. Accordingly, the plunger 45, the transmitting pin 34 and the plunger 22 are moved forward. When the shock absorbing member 23 contacts the pin 25, the pressure moving the open-close valve 26 rearward (the pressure toward the valve seat 28) by the brake pressure in the pressure transmitting chamber R3 is set to be larger than the biasing force of the spring 24. Accordingly, as shown in FIG. 7, even when the shock absorbing member 23 is in contact with the pin 25, the closed condition of the open-close valve 26 is maintained. Under this condition, the plunger 45 is engaged with the key member 49, and the third piston 29 and the second piston 12 are moved forward through the brake fluid filled in the pressure transmitting chamber R3. In this manner, the input-output performance is shown after point "a" in FIG. 9.

Figure 8:
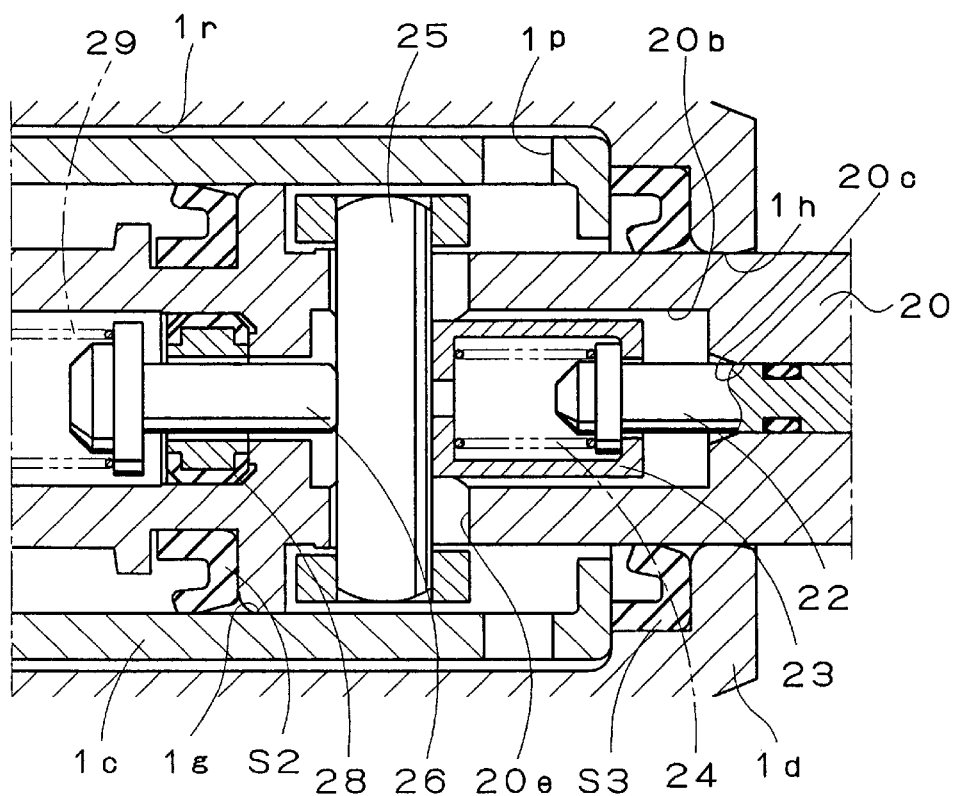
FIG. 8 is a cross-sectional view of the valve device portion when the negative pressure booster fails.

When the negative pressure booster 40 fails, the second transmitting member 32 is not moved forward and the pressure transmitting chamber R3 is connected with the reservoir 4 through the port 1p, the hydraulic passage 1r, and the port 1j, and becomes the atmospheric pressure. When the input rod 3 moves forward in response to the operation of the brake pedal, the third piston 20 is in contact with the second piston 12 and the two pistons move forward integrally. That is, when the input rod 3 moves forward in response to the operation of the brake pedal, the shock absorbing member 23 is in contact with the pin 25 to push the pin 25 forward as shown in FIG. 8. Because the biasing force associated with the spring 24 is set to be larger than that of the spring 29, the open-close valve 26 is separated from the valve seat 28. The pressure transmitting chamber R3 is connected with the reservoir 4 and becomes atmospheric pressure just as the pressure in the hydraulic chamber R4 as shown in FIG. 4.

Accordingly, the third and the second piston 20, 12 are mechanically connected together and move forward integrally. The brake pressure outputted in this case is not defined by the effective cross-sectional area of the large diameter land portion 20a of the third piston 20, but by the effective cross-sectional area of the second piston 12. The input-output performance in this condition is shown in FIG. 9 with the lower dashed line. Even when the negative pressure booster 40 fails, a pressure increase gradient can be increased compared to the performance of the known device described above.

As explained above, in the hydraulic brake device of the present embodiment which possesses a relatively simple structure, when the negative pressure booster 40 fails, the input-output performance shown as the dashed line in FIG. 9 can be obtained. In brief, if the negative pressure booster 40 fails, a braking force larger than that of the known device described above is outputted and the proper braking force can be obtained. Accordingly, a high advantage of the hydraulic pressure brake device of the present embodiment is that it can assure braking in an emergency. Moreover, the transmitting pin 34 extends forward through the reaction force rubber disc 33 and is in contact with the rear end surface of the first transmitting member 31. Accordingly, the braking operation can be smoothly maintained even when the negative pressure booster 40 fails. In this embodiment, because the valve device 21 is provided in the hollow portion 20b of the third piston 20, the valve device of the present invention can be made relatively easily.

Moreover, if the sealing performance of the sealing members S1, S2 positioned forward and rearward of the pressure transmitting chamber R3 is defective and the negative pressure booster 40 is operated, the pressure in the pressure transmitting chamber R3 cannot be maintained, and the sealing defect can be immediately detected because the third piston 20 is maintained in contact with the second piston 12 in this condition. If the sealing performance of the sealing members S1, S2 are defective during the assisting operation by the negative pressure booster 40, the pressure in the pressure transmitting chamber R3 becomes zero and the third piston 20 comes in contact with the second piston 12 and the stroke of the brake pedal is increased to permit detection of such sealing defect. In this manner, the defect of the sealing performance can be detected immediately without providing any additional expensive pressure sensors.

Figure 10:
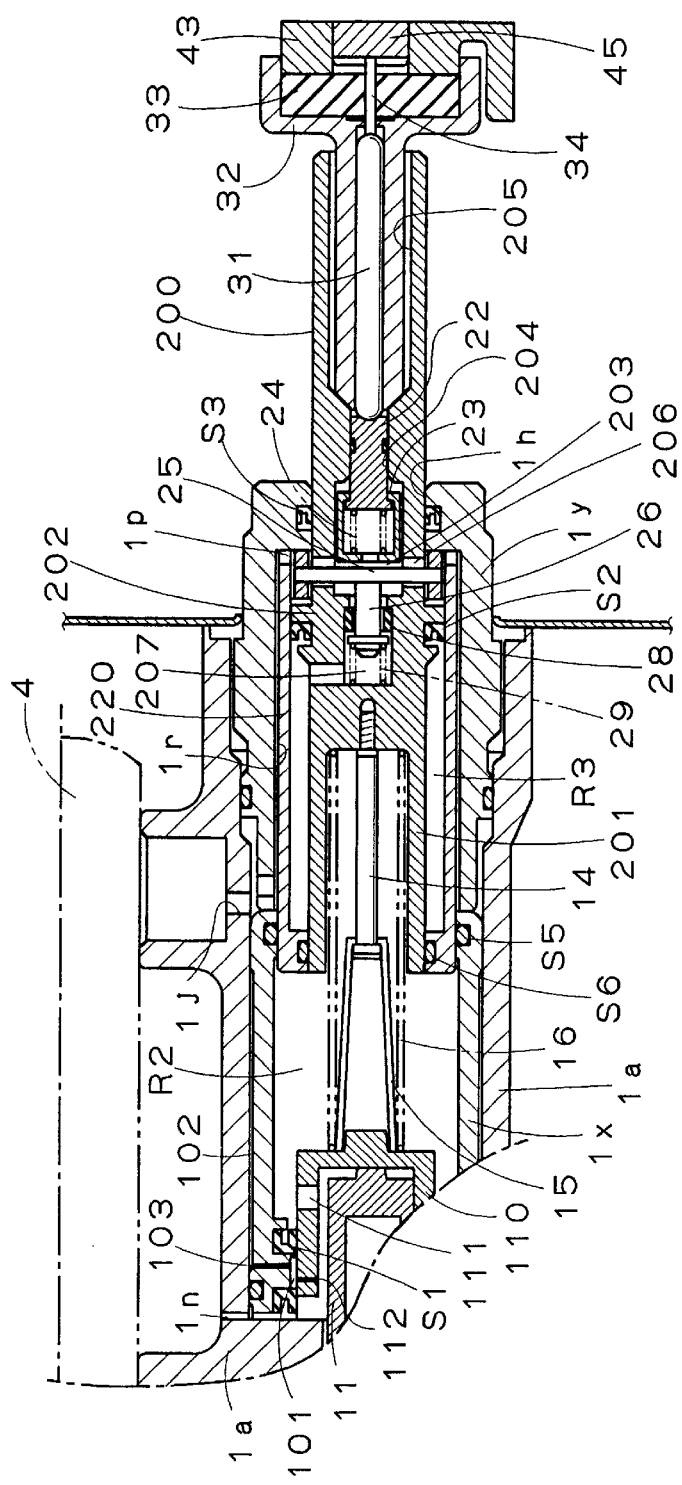
FIG. 10 is a cross-sectional view of a part of a master cylinder portion of a hydraulic brake device according to another embodiment of the present invention.

FIG. 10 is a cross-sectional view of a part of the master cylinder portion of the hydraulic brake device according to another embodiment of the invention. The parts of this embodiment which correspond to those of the earlier embodiment are designated by the same reference numerals and a detailed description of such parts is not repeated here. In this second embodiment, the second piston 12 and the third piston 20 in the embodiment of FIGS. 1 and 2 form a double cylindrical structure. A part of the third piston is configured with a second piston 200 in this embodiment. A piston portion 201 forming a master piston is formed at the front of the second piston 200. The rearward structure of the second piston 200 corresponds to that of the third piston 20 in FIG. 1. A third piston 220 forming an auxiliary piston of the present embodiment is of cylindrical shape. The outer diameter portion of this third piston 220 generally corresponds to the large diameter portion 20a of the third piston 20 in FIG. 1.

A cup-shaped sealing member S5 is positioned at the inner periphery of the opening portion at the rear end of a cylinder 1x which corresponds to the second cylinder 1b in FIG. 1. The third piston 220 is fluid-tightly and slidably inserted into the sealing member S5. A part of the second piston 200 and the third piston 220 are accommodated in a cylinder 1y corresponding to the fourth cylinder 1d in FIG. 1. Accordingly, a stationary cylinder corresponding to the third cylinder 1c in FIG. 1 is not provided in this embodiment. The second piston 200 is slidably supported in the hollow portion of the third piston 220. The third piston 220 is also configured to work as a movable cylinder sliding in the cylinder 1x.

Further, a cylindrical fourth piston 110 having a bottom portion is positioned in the cylinder 1x in a fluid-tight and slidable manner. The first piston 11 is accommodated in the fourth piston 110. The rod 14, the retainer 15 and the spring 16 are provided between the fourth piston 110 and the second piston 200. Because the annular member 18 in FIG. 1 is not provided, communication and the interruption of the reservoir 4 is achieved between the cylinder 1x and the fourth piston 110. A first annular groove 101 is formed in inner periphery of the front end portion of the cylinder 1x, and a second annular groove 102 is formed on the outer periphery of the cylinder 1x. The second annular groove 102 is always connected with the fluid supply port 1j. A communicating passage 103 connecting the first annular groove 101 with the second annular groove 102 is also provided in the cylinder 1x. Sealing members S1 are located forwardly and rearwardly of the first annular groove 101.

The fourth piston 110 is provided with a first communicating bore 111 opening into the second pressure chamber R2. The first communicating bore 111 is always in communication with the second pressure chamber R2. A second communicating bore 112 is always in communication with the first annular groove 101. The communication of the second communicating bore 112 with the first annular groove 101 is interrupted when the fourth piston 110 moves forward. Accordingly, when the brake pedal is not depressed, the second pressure chamber R2 is configured to be in communication with the fluid supply port 1j through the first and the second communicating bores 111, 112, the first annular groove 101, the communicating passage 103, and the second annular groove 102. When the brake pedal is depressed, the fourth piston 110 moves forward and communication between the second communicating bore 112 and the first annular groove 101 is interrupted. The output port 1n is configured to be in communication with the second pressure chamber R2 through the clearance between the front end of the cylinder 1x and the first cylinder 1a, and the first communicating bore 111.

As shown in FIG. 10, a cup-shaped sealing member S6 is located at the inner periphery of the opening portion at the front of the third piston 220. The piston portion 201 of the second piston 200 is positioned in a fluid-tight and slidable manner in the sealing member S6. The annular hydraulic passage (hydraulic passage) 1r is formed between the third piston 220 and the cylinder 1y. The port 1p connected to the hydraulic passage 1r is formed at the rear portion of the third piston 220 as shown in FIG. 10.

A land portion 202 is formed on an intermediate or middle portion of the second piston 200. The cup-shaped sealing member S2 is located in front of the land portion 202. The land portion 202 is accommodated in a fluid-tight and slidable manner in the third piston 220. Accordingly, the pressure transmitting chamber R3 is defined between the inner surface of the third piston 220 and the outer surface of the second piston 200, and between the sealing member S6 and the sealing member S2.

The second piston 200 is supported in a fluid-tight and slidable manner in the bore 1h of the cylinder 1y through the cup-shaped sealing member S3 at the rear of the land portion 202. Further, the second piston 200 is provided with hollow portions 203, 204, 205 corresponding to the hollow portions 20b, 20c, 20d of the third piston 20 in the FIG. 1 embodiment. Axially elongated holes 206 are formed in the top and bottom at the rear of the land portion 202. Each elongated hole 206 is connected with the hollow portion 203.

In the present embodiment, a valve device is provided in the second piston 200. Explaining in more detail the valve structure, the plunger 22 is supported in a fluid-tight and slidable manner in the hollow portion 204. The shock absorbing member 23 is provided at the front end of the plunger 22 and the pin 25 is inserted through the elongated holes 206. The pin 25 is movably supported in the axial direction of the elongated holes 206 and is arranged in front of the shock absorbing member 23. A hollow portion 207 connected to the hollow portion 203 and the hydraulic passage 1r is formed at the front of the hollow portion 203. The open-close valve 26 is accommodated in the hollow portion 207 (a case 27 in FIG. 1 is omitted in this embodiment). The front portion of the open-close valve 26 includes a flange portion. The open-close valve 26 is movably supported in the axial direction in the hollow portion 207 and is arranged to be in contact with the pin 25 at the rear end of the shaft portion. The valve seat 28 is provided between the hollow portion 203 and the hollow portion 207. The spring 29 is provided in front of the open-close valve 26. The flange portion of the open-close valve 26 is biased in a direction causing the flange portion to be seated on the valve seat 28.

With the above-described structure of the valve device, when the brake pedal is not depressed as shown in FIG. 10, the pressure transmitting chamber R3 is connected with the reservoir 4 from the hollow portion 207 through the valve seat 28, the elongated holes 206, the port 1p, and the hydraulic passage 1r. When the brake pedal is depressed, the second piston 200 moves forward and the pin 25 moves in the elongated holes 206. The open-close valve 26 moves backward being in contact with the pin 25 by the biasing force of the sprig 29. When the flange portion of the open-close valve 26 is seated on the valve seat 28, communication between the pressure transmitting chamber R3 and the hydraulic passage 1r is interrupted. When the pin 25 is positioned at the rear end of the elongated holes 206, the flange portion of the open-close valve 26 remains seated on the valve seat 28. In this manner, when the flange portion of the open-close valve 26 is seated on the valve seat 28, the pressure transmitting chamber R3 becomes a hydraulically sealed space filled with the brake fluid. In this condition, the second piston 200 and the third piston 220 are hydraulically combined and move forward.

When the brake pedal is depressed while the second piston 200 is stopped for instance, and the plunger 22 is moved forward relative to the third piston 220, the shock absorbing member 23 comes into contact with the pin 25. When the plunger 22 is further moved forward, the open-close valve 26 is moved forward through the shock absorbing member 23 and the pin 25. The flange portion of the open-close valve 26 is separated from the valve seat 28 and the pressure transmitting chamber R3 is connected with the hydraulic passage 1r. Accordingly, with this embodiment which possesses a relatively simple structure, an input-output performance as shown with a dashed line in FIG. 9 can be obtained even when the negative pressure booster 40 fails. In this embodiment, because the open-close valve 26 is accommodated in the hollow portion of the second piston 200, the valve device is relatively easily configured.

In the present embodiment as well as the previous embodiment, if the sealing performance of the sealing members S6, S2 located forward and rearward of the pressure transmitting chamber R3 is defective, even if the negative pressure booster 40 is operated, the pressure in the pressure transmitting chamber R3 cannot be maintained. Accordingly, the sealing defect can be immediately detected because only the second piston 200 is moved forward. If the sealing performance of the sealing members S6, S2 is defective during the assisting operation by the negative pressure booster 40, the pressure in the pressure transmitting chambers R3 becomes zero and only the second piston 200 is moved forward and so the stroke of the brake pedal is increased, thus providing an indication of the sealing defect.

Figure 11:
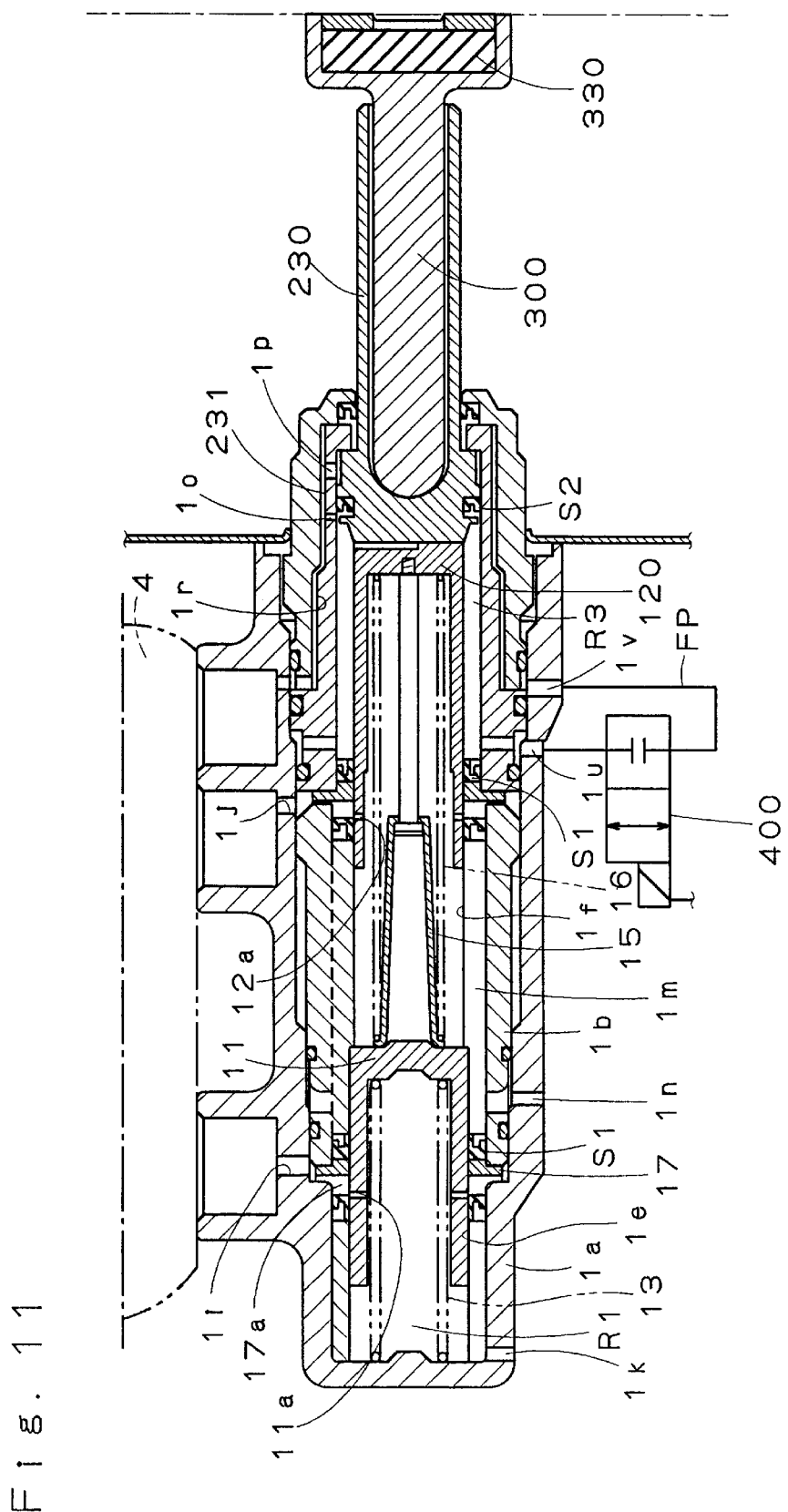
FIG. 11 is a cross-sectional view of a master cylinder portion of a hydraulic brake device according to a further embodiment of the present invention.

FIG. 11 is a cross-sectional view of the master cylinder portion of the hydraulic brake device according to a further embodiment of the invention. The master cylinder in FIG. 11 is a general tandem master cylinder with a pressure transmitting chamber according to the present invention. The valve device of this embodiment is configured with a solenoid valve 400. Accordingly, the valve device is not provided in a second piston 120 and a third piston 230. The third piston 230 is provided at the rear of the second piston 120 (a conventional second master piston) and the pressure chamber R3 is formed therebetween. The third piston 230 is a cylindrical body having a bottom portion and providing a large diameter portion 231 corresponding to the large diameter portion 20a in FIG. 1. The front end portion of a transmitting member 300 is accommodated in the hollow portion of the third piston 230. The rear end portion of the transmitting member 300 is connected with the negative pressure booster 40 (not shown in FIG. 11) through a reaction force rubber disc 330. The transmitting pin 34 in the previous embodiments is not provided in the transmitting member 300 of this embodiment.

The pressure transmitting chamber R3 is connected with the hydraulic passage 1r and thus the reservoir 4 through a port 1o at the initial position as shown in FIG. 11. A port 1u connected to the pressure chamber R3 and a port 1v connected to the hydraulic passage 1r are formed on the cylinder 1a. Both ports 1u, 1v are connected with each other through a hydraulic passage FP. The hydraulic passage FP is provided with a normally closed solenoid valve 400. Further, a hydraulic pressure sensor (not shown) and a stroke sensor (not shown) are provided. A controller (not shown) controls the solenoid valve 400 by opening and closing the solenoid valve 400 in response to the detection results from the aforementioned sensors.

According to the present invention, because the solenoid valve 400 is a normally closed type valve, communication through the hydraulic passage FP is normally interrupted. When a brake pedal (not shown) is depressed, the negative pressure booster 40 is operated. Then the third and the second pistons 230, 120 are moved forward through the transmitting member 300, and further the first piston 11 is moved forward. At this time, the pressure transmitting chamber R3 forms a hydraulically sealed space. When the third piston 230 is moved forward by the assisting operation of the negative pressure booster 40, a clearance is defined between the rear end surface of the second piston 120 and the front end surface of the third piston 230. A hydraulic chamber (not shown) is formed at the rear of the large diameter portion 231 of the third piston 230. Accordingly, the third piston 230 and the second piston 120 are hydraulically combined through the brake fluid filled in the pressure transmitting chamber R3. The third and the second pistons 230, 120 move forward and hydraulic pressure is supplied based on the cross-sectional area of the land portion 231.

When the hydraulic pressure sensor detects that the negative pressure booster 40 has failed, the solenoid valve 400 is opened and so communication through the hydraulic passage FP is permitted. Accordingly, the pressure transmitting chamber R3 is connected with the hydraulic passage 1r (and the reservoir 4) through the port 1u, the solenoid valve 400, and the port 1v, and becomes atmospheric pressure. The third piston 230 moves forward integrally with the second piston 120 by virtue of being in contact with the second piston 120. In this embodiment, the presence of the solenoid valve 400, the hydraulic pressure sensor and other necessary features increases the cost as compared to the earlier embodiments. However, the third piston 230 and the second piston 120 can be properly hydraulically combined. When the negative pressure booster 40 is fails, the input-output performance shown by the dashed line in FIG. 9 can be obtained.

In the above described embodiment, the negative pressure booster 40 is used as an assisting device for purposes of explanation, but other hydraulic pressure assisting device such as a hydraulic pressure booster and a regulator can be used.

The vehicle hydraulic brake device of the present invention is provided with the auxiliary piston having the effective cross-sectional area larger than that of the master piston. The pressure transmitting chamber is provided between the master piston and the auxiliary piston is operatively associated with the assisting operation of the assisting device. When the operation of the master cylinder piston is assisted through the auxiliary piston by the assisting device, the pressure transmitting chamber is hydraulically sealed by the valve device. When the assisting is not operated by the assisting device, the pressure transmitting chamber is connected with the reservoir through the valve device. Accordingly, by simply altering the structure of the master cylinder compared to the previously described known hydraulic pressure brake devices, even when the assisting device fails, the proper input-output performance can be assured.

Also, because the valve device can be provided in the auxiliary piston and the master piston without any complicated control device, the proper input-output performance can be assured even when the assisting device fails. Additionally, if the sealing performance of the pressure transmitting chamber is defective, the sealing defect can be detected relatively quickly or immediately.

Further, because the valve device is configured as explained above, the structure of the valve device can be mechanically formed. With the relatively simple structure described above, the proper input-output performance can be assured when the assisting device fails. Further, defective sealing performance of the pressure transmitting chamber can be detected relatively quickly or immediately.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claim is:

1. A hydraulic brake device for a vehicle, comprising:
   a master cylinder having a master piston for supplying brake pressure in response to brake pedal depression;
   an assisting device for assisting actuation of the master piston in response to brake pedal depression;
   an auxiliary piston including an effective cross-sectional area larger than that of the master piston and being operatively associated with the assisting operation of the assisting device;
   a pressure transmitting chamber provided between the auxiliary piston and the master piston, the pressure transmitting chamber being defined around an outer surface of the master piston; and
   a valve mechanism for hydraulically closing the pressure transmitting chamber when the actuation of the master piston is assisted by the assisting device through the auxiliary piston and establishing hydraulic communication between the pressure transmitting chamber and a reservoir of the master cylinder when the actuation of the master piston is not assisted by the assisting device.

2. The hydraulic brake device according to claim 1, wherein the auxiliary piston is provided coaxially with the master piston and is positioned rearward of the master piston, the auxiliary piston including a large diameter portion having the effective cross-sectional area larger than that of the master piston, and wherein the pressure transmitting chamber is provided between the large diameter portion and the master piston, and the valve mechanism is provided in the auxiliary piston.

3. The hydraulic brake device according to claim 2, including:
   a hydraulic passage formed in the master piston or in the auxiliary piston for connecting the pressure transmitting chamber with the reservoir;
   the valve mechanism including a valve seat disposed in the hydraulic passage, a valve body adapted to be seated on or separated from the valve seat for closing or opening the hydraulic passage, a first biasing means always biasing the valve body toward the valve seat, a brake input transmitting member for driving the valve body in response to the brake pedal depression when the assisting device is not operated, a shock absorbing member engaged with the brake input transmitting member and arranged to be in contact with the valve body, and a second biasing means always biasing the shock absorbing member toward the valve body opposite to the brake input transmitting member with a biasing force larger than that of the first biasing means.

4. The hydraulic brake device according to claim 1, wherein the auxiliary piston includes a cylindrical body accommodating the master piston in a fluid-tight and slidable manner, the auxiliary piston further including the pressure transmitting chamber between an inner surface of the cylindrical body and the outer surface of the master piston, and wherein the valve mechanism is provided in the master piston.

5. The hydraulic brake device according to claim 4, including:
   a hydraulic passage formed in the master piston or in the auxiliary piston for connecting the pressure transmitting chamber with the reservoir;
   the valve mechanism including a valve seat disposed in the hydraulic passage, a valve body adapted to be seated on or separated from the valve seat for closing or opening the hydraulic passage, a first biasing means always biasing the valve body toward the valve seat, a brake input transmitting member for driving the valve body in response to the brake pedal depression when the assisting device is not operated, a shock absorbing member engaged with the brake input transmitting member and arranged to be in contact with the valve body, and a second biasing means always biasing the shock absorbing member toward the valve body opposite to the brake input transmitting member with a biasing force larger than that of the first biasing means.

6. The hydraulic brake device according to claim 1, wherein the assisting device is a negative pressure booster.

7. A hydraulic brake device for a vehicle, comprising:
   a master cylinder for supplying brake pressure in response to brake pedal depression, the master cylinder including a master piston;
   an assisting device for assisting actuation of the master piston in response to brake pedal depression;
   an auxiliary piston operatively associated with the assisting device to be operated upon operation of the assisting device, the auxiliary piston including an effective cross-sectional area larger than that of the master piston;
   a pressure transmitting chamber provided between the auxiliary piston and the master piston, the pressure transmitting chamber being defined around an outer surface of the master piston;
   a hydraulic passage formed in the master piston or in the auxiliary piston;

a valve seat disposed in the hydraulic passage;

a valve body biased by a spring to engage the valve seat to close the hydraulic passage and seal the pressure transmitting chamber when the actuation of the master piston is assisted by the assisting device through the auxiliary piston, the valve body being movable away from the valve seat to open the hydraulic passage and establish hydraulic communication between the pressure transmitting chamber and a reservoir of the master cylinder when the actuation of the master piston is not assisted by the assisting device.

8. The hydraulic brake device according to claim 7, wherein the auxiliary piston is coaxial with the master piston and positioned rearward of the master piston.

9. The hydraulic brake device according to claim 7, wherein the auxiliary piston includes a large diameter portion possessing the effective cross-sectional area larger than that of the master piston, the pressure transmitting chamber being provided between the large diameter portion and the master piston.

10. The hydraulic brake device according to claim 9, wherein the hydraulic passage is provided in the auxiliary piston.

11. The hydraulic brake device according to claim 7, wherein the spring is a first spring, and including a brake input transmitting member for driving the valve body in response to brake pedal depression during non-operation of the assisting device, a shock absorbing member engaged with the brake input transmitting member and adapted to contact the valve body, and a second spring always biasing the shock absorbing member toward the valve body in a direction opposite the brake input transmitting member.

12. The hydraulic brake device according to claim 11, wherein the second spring applies a biasing force larger than that of the first spring.

13. The hydraulic brake device according to claim 7, wherein the auxiliary piston includes a cylindrical body accommodating the master piston in a fluid-tight and slidable manner.

14. The hydraulic brake device according to claim 13, wherein the pressure transmitting chamber is located in the auxiliary piston between an inner surface of the cylindrical body and an outer surface of the master piston.

15. The hydraulic brake device according to claim 14, wherein the hydraulic passage is provided in the master piston.

16. The hydraulic brake device according to claim 7, wherein the assisting device is a negative pressure booster.

17. The hydraulic brake device according to claim 1, wherein the valve mechanism establishes hydraulic communication between the pressure transmitting chamber and the reservoir of the master cylinder when the actuation of the master piston is not assisted by the assisting device even if the brake pedal is depressed.

18. The hydraulic brake device according to claim 7, wherein the valve body is movable away from the valve seat to open the hydraulic passage and establishes hydraulic communication between the pressure transmitting chamber and the reservoir of the master cylinder when the actuation of the master piston is not assisted by the assisting device even if the brake pedal is depressed.

* * * * *